United States Patent
Krolczyk et al.

(10) Patent No.: US 7,383,494 B2
(45) Date of Patent: Jun. 3, 2008

(54) GENERATING A CONFIRMATION SHEET LISTING IDENTIFIERS, THUMBNAILS, AND PAGES ASSOCIATED WITH PAGE THUMBNAILS

(75) Inventors: Marc J. Krolczyk, Rochester, NY (US); Shane Jewitt, Rochester, NY (US); Andrew T. Martin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 527 days.

(21) Appl. No.: 10/248,386

(22) Filed: Jan. 15, 2003

(65) Prior Publication Data
US 2004/0139390 A1    Jul. 15, 2004

(51) Int. Cl.
*G06F 15/00* (2006.01)
(52) U.S. Cl. ............... 715/200; 715/838; 358/401; 358/405
(58) Field of Classification Search ......... 715/500, 715/513, 501.1, 526–527, 835, 838, 200, 715/251, 255–256, 273, 277; 345/660, 665, 345/670; 358/448, 450–452, 401–403, 405
See application file for complete search history.

(56) References Cited

U.S. PATENT DOCUMENTS

| | | | |
|---|---|---|---|
| 5,377,017 A * | 12/1994 | Lam | 358/405 |
| 5,818,608 A * | 10/1998 | Nakano | 358/434 |
| 6,188,766 B1 * | 2/2001 | Kocher | 380/246 |
| 6,518,982 B2 * | 2/2003 | Dow et al. | 715/772 |
| 6,611,291 B1 * | 8/2003 | Dow et al. | 348/333.01 |
| 6,643,028 B1 * | 11/2003 | Ogaki et al. | 358/1.6 |
| 2001/0034739 A1 * | 10/2001 | Anecki et al. | 707/500 |
| 2003/0020959 A1 * | 1/2003 | Henry | 358/402 |
| 2003/0048484 A1 * | 3/2003 | Seki et al. | 358/402 |

* cited by examiner

*Primary Examiner*—Cesar B Paula
(74) *Attorney, Agent, or Firm*—Oliff & Berridge, PLC (57) ABSTRACT

Typical confirmation sheets include a general job status and a reduced image of the first page of the job. This may be sufficient for a job comprising a single service and a single destination or recipient. The confirmation sheet would be more useful if it provided images of each page of a transmission, such as for a multi-service and/or multi-destination job. In various exemplary embodiments, thumbnail images of one more pages of the transmission are included on the confirmation sheet. The pages to be included as thumbnail images on the confirmation sheet can be selected. The range of pages can be selected. Alternatively, individual ones of the pages can be specified. If the selected set of thumbnail images would not fit onto a single page, the user is given the option to use a multi-page confirmation sheet or to re-select the pages to be included on the confirmation sheet.

17 Claims, 10 Drawing Sheets

FIG. 1

Confirmation Page
User:lanid
June 21.2001 – 08:00AM

1200 — Scan Settings
1201 — Original Type — MIXED
1202 — Auto Exposure — lead_edge
1203 — Lighted/Darken — 0
1204 — Sides Imaged — 1 Side
1205 — Resolution — 300X300
1206 — Contrast — 1
1207 — Sharpness — 0
1208 — Image Size — Auto 1300 — Job Information
1301 — Device Name — PMC0
1302 — System Date — 6-21-01
1303 — System Time — 8:30 am
1304 — Submit Time — 7:30 am

*FIG. 2*

Confirmation Page
User:lanid
June 21.2001 – 08:00AM

| Services | Distribution List | Status | Send Settings | |
|---|---|---|---|---|
| Multi Destination Status | | | | |
| EMAIL | To: Andy@yahoo.com<br>CC: Fred@hotmail.com | Success<br>PENDING | File Type<br>Priority | PDF<br>Low |
| SCAN | 13.100.10.123<br>IDHI Documents | Success<br>Success | File Type<br>User | PDF<br>lanid |
| FAX | Ken-423-1234<br>212-123-1234<br>212-345-3456 | PENDING<br>Success<br>FAILED :Com error | Resolution<br>Super<br>Priority<br>Cover Sheet | High<br>03<br>High<br>ON |
| IFAX | Tom@yahoo.com | PENDING | From<br>Priority | lanid<br>Low |
| PRINT | Doc Center 23 | PENDING | Quantity<br>Collate & Staple<br>Resolution | 10<br><br>300 dpi |

GENERATING A CONFIRMATION SHEET LISTING IDENTIFIERS, THUMBNAILS, AND PAGES ASSOCIATED WITH PAGE THUMBNAILS

BACKGROUND OF THE INVENTION

1. Field of Invention

This invention is directed to the systems and methods for generating document distribution confirmation sheets.

2. Description of Related Art

Confirmation sheets are routinely used to provide status for document distribution jobs. Many existing document distribution systems can distribute documents to multiple destinations and can include multiple services, such as faxing, copying by sending to a printer, scan-to-file and scan-to-repository. Currently, confirmation sheets are presently used that may include an overall general job status. However, the overall job status report does not individually identify which recipients may or may not have received the job if the entire distribution job was not successful.

Present confirmation sheets also contain general job parameters such as submittal time and originating user and/or device. Job settings and information about the input document, such as file type, or image specifications, such as resolution, contrast and sharpness, are often on current confirmation sheets. Current job information also often includes length or size of the job and whether it is two-sided. Some existing confirmation sheets also provide a reduced image of the first page of the job.

SUMMARY OF THE INVENTION

Currently, typical confirmation sheets include a general job status and a reduced image of the first page of the job. This may be sufficient for a job comprising a single service and a single destination or recipient. The confirmation sheet would be more useful if it provided status information for each service, for each destination or recipient and/or images of each page of a transmission, such as for a multi-service and/or multi-destination job.

This invention separately provides systems and methods that generate on the confirmation sheet a thumbnail image of one or more pages of the job.

In various exemplary embodiments, thumbnail images of one or more pages of the multi-destination and/or multi-service job are included on the confirmation sheet. In various exemplary embodiments, the pages to be included as thumbnail images on the confirmation sheet can be selected. In various exemplary embodiments, the range of pages can be selected. In various other exemplary embodiments, individual ones of the pages can be specified. In various exemplary embodiments, if the selected set of thumbnail images would not fit onto a single page, the user is given the option to use a multi-page confirmation sheet or to re-select the pages to be included on the confirmation sheet.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description of various exemplary embodiments of the confirmation sheets, systems and methods according to this invention describes the confirmation sheets, systems and methods relative to both multi-destination/multi-service status information and thumbnail images. However, it should be appreciated that the confirmation sheets, systems and methods according to this invention can include or implement only the thumbnail images, independently of the multi-destination/multi-service status information.

Figure 1:
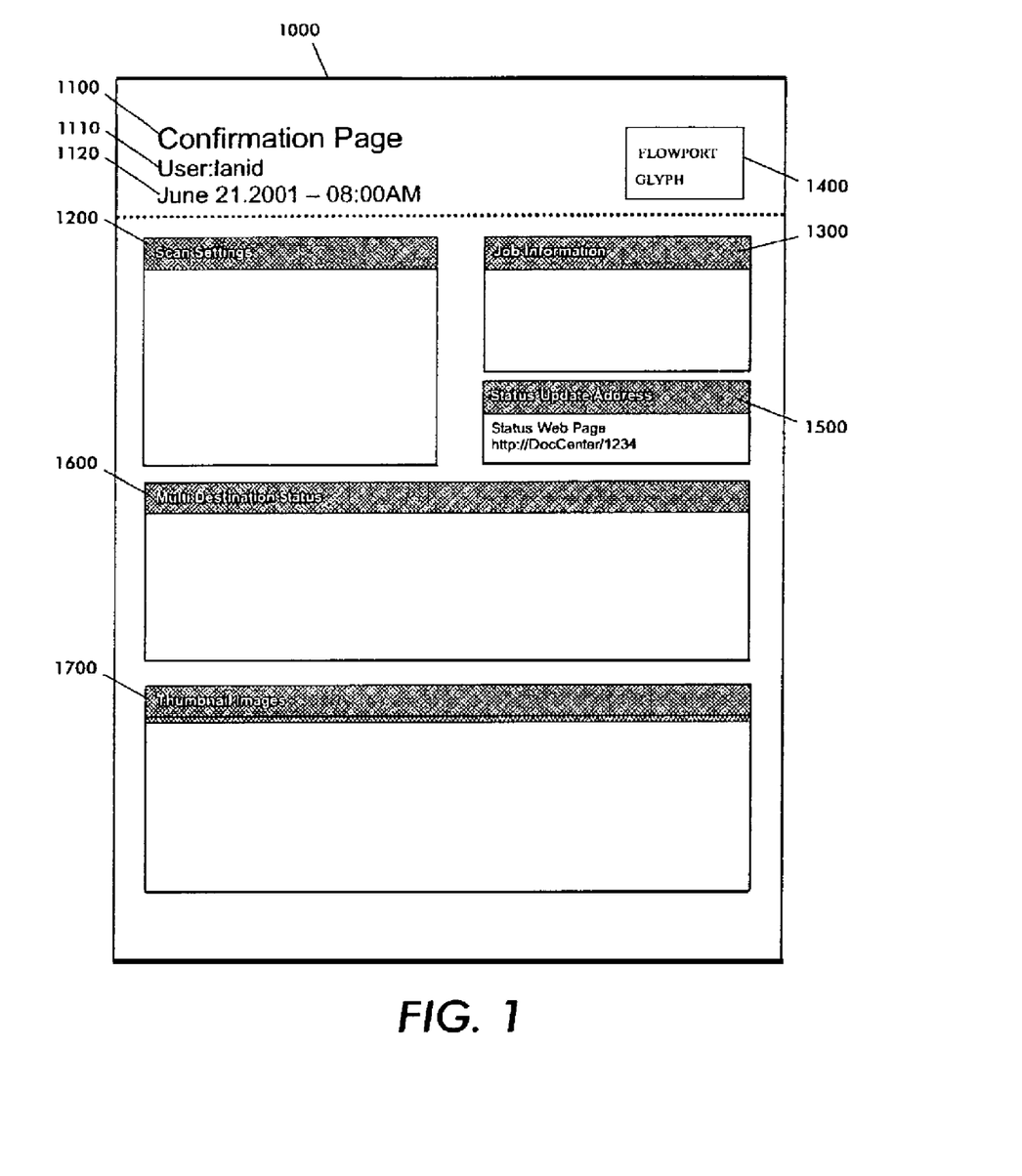
FIG. 1 illustrates one exemplary embodiment of a confirmation sheet containing multi-destination, multi-service status and thumbnail images of pages.

FIG. 1 illustrates one exemplary embodiment of a confirmation sheet 1000 with multi-destination status and thumbnail images. At the top of each page of the confirmation sheet 1000 is a request information portion 1100. The request information portion 1100 includes the name or address 1110 of the user/requestor and the time 1120 of the request. A scan settings portion 1200 identifies any specific parameters that were used when one or more documents in the job were input. A job information portion 1300 identifies information unique to the current document distribution job.

A flowport glyph 1400 is a pattern that is recognized by a scanner and that identifies the document distribution job. By placing the original confirmation sheet in a scanner, a request for an updated confirmation sheet can be automatically generated by scanning, recognizing and acting on the flowport glyph 1400. A status update address 1500 is a network address at which an update of the information contained in the confirmation sheet can be viewed, and, in various exemplary embodiments, from which an updated confirmation sheet can be downloaded and/or printed. One exemplary embodiment of this address is a web URL. It should be appreciated that any known or later-developed network addressing system or method can be used when implementing the status update address 1500. It should be appreciated that only one of the flowport glyph 1400 and the status update address 1500 need be used and then only if one or more of the selected services and/or destinations or recipients was not completed.

A multi-destination status portion 1600 provides status information for each service, for each destination and/or for recipient of the document distribution job. It should be appreciated that the multi-destination status portion 1600 may be omitted or reduced if only a single service to a single destination or recipient is used. A thumbnail images portion 1700 provides thumbnail images of one or more requested pages of the document distribution job. It should be appreciated that, if no pages for which thumbnail images are desired are identified, the thumbnail images portion 1700 can be omitted. It should also be appreciated that the confirmation sheet may have multiple pages depending on the number of recipients of the distribution job and/or the number of thumbnail images requested.

Figure 2:
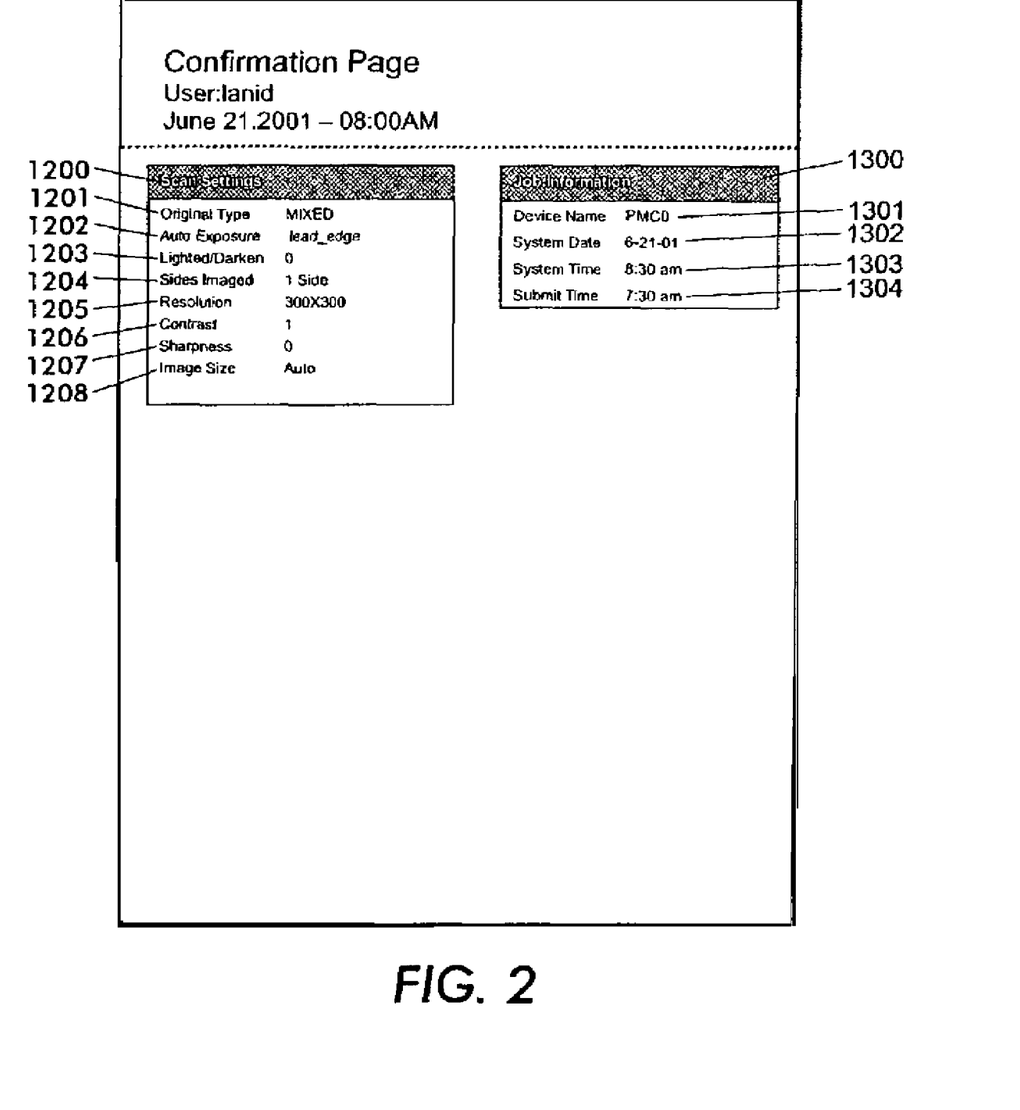
FIG. 2 illustrates in greater detail one exemplary embodiment of a general scan settings and job information portion of a confirmation sheet.

FIG. 2 illustrates in greater detail one exemplary embodiment of the general scan settings portion 1200 and the job information portion 1300 of the confirmation sheet 1000. As shown in FIG. 2, the scan settings portion 1200 identifies any specific parameters used when document distribution job was input. These parameters include an original type 1201, an auto exposure method 1202, a lighten/darken level 1203, a number of sides imaged 1204, a resolution 1205, a contrast level 1206, a sharpness level 1207 and an image size 1208 that were used when scanning the one or more input documents. It should be appreciated that the settings included in the confirmation sheet 1000 can be set as a predetermined set of features or can be selectably determined when a job is submitted or a status is requested. It should also be appreciated that any one or more of the parameters of the scan setting portion 1200 shown in FIG. 2 may be omitted. It should also be appreciated that any other known or later-developed document input parameter can be included in the scan settings portion 1200.

As shown in FIG. 2, the job information portion 1300 identifies the information unique to the current document distribution job. This information includes a device name 1301 that the document was input from, a system date 1302 and a system time 1303 that the confirmation sheet 1000 was generated and a submittal time 1304 of the document distribution job. It should be appreciated that one or more of the information items of the job information portion 1300 may be omitted. It should also be appreciated that any other known or later-developed information item can be included in the job information portion 1300.

Figure 3:
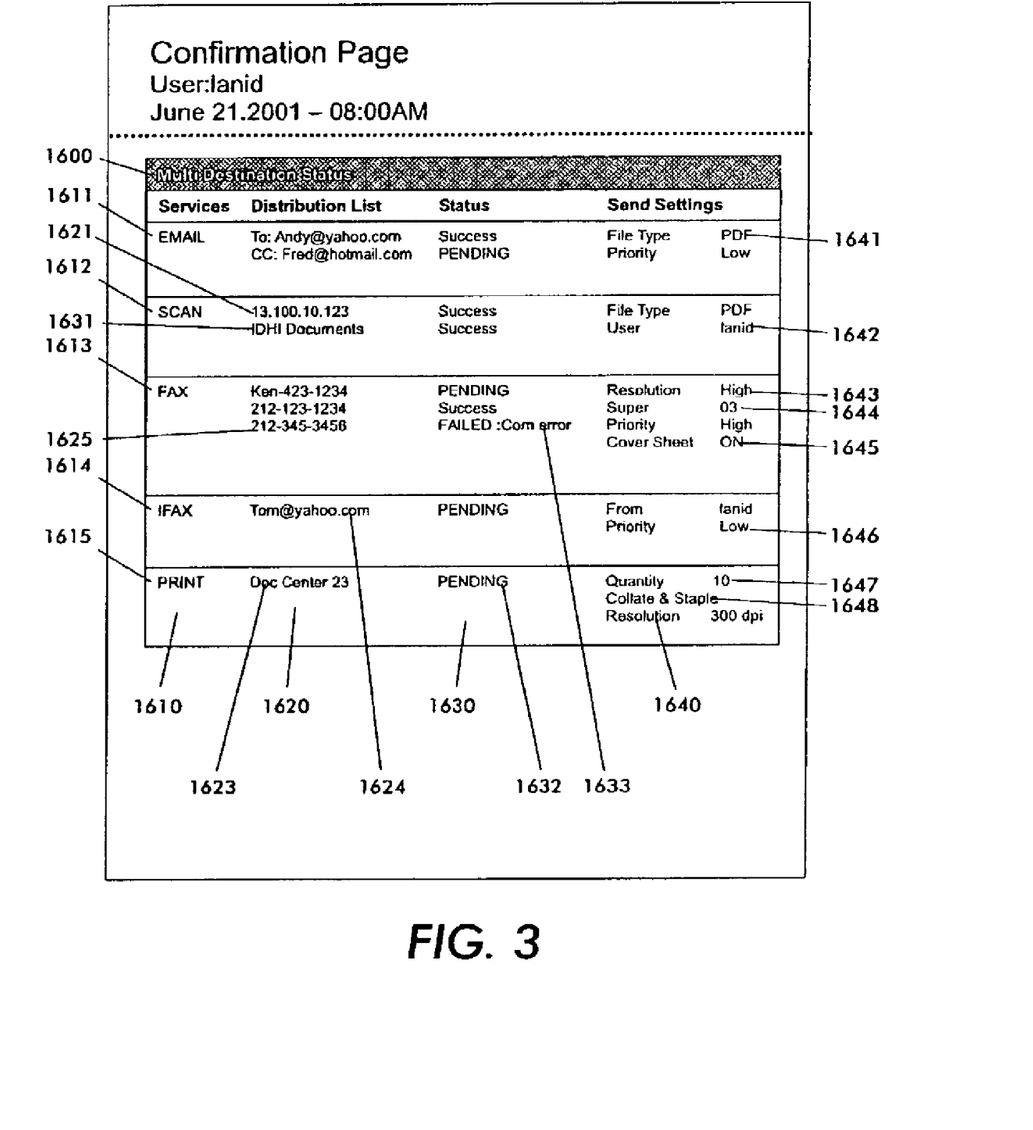
FIG. 3 illustrates in greater detail one exemplary embodiment of a multi-destination and/or multi-service portion of a confirmation sheet.

FIG. 3 illustrates in greater detail one exemplary embodiment of the multi-destination status portion 1600 of the confirmation sheet 1000. The status of each destination and/or recipient of the document distribution job is displayed in a separate area in the confirmation sheet 1000. Each such area for a particular destination or recipient contains a type of service 1610, a recipient identification 1620, which is also referred to as a distribution list, a status 1630, and a send settings 1640 for the destination and/or recipient identified in that area of the confirmation sheet 100-. The services 1610 that could be used include, for example, email 1611, scan to file/repository 1612, facsimile communications 1613, internet facsimile (IFAX) communications 1614 and/or scan to print 1615. It should be appreciated that any one or more of the services shown in FIG. 3 may be omitted from the multi-destination status portion 1600. It should also be appreciated that any known or later-developed document distribution service can be included in the multi-destination status portion 1600.

The distribution list 1620 identifies each of the recipients of the job. The scan destinations are identified with an IP address 1621 or a network path name 1622. Facsimile communications recipients are identified by a phone number 1625. Email communications and internet facsimile communications recipients are identified by an email address 1624. Print job destinations are identified by a network path name of the printer 1623. It should be appreciated that any one or more of the identification formats may be omitted. It should also be appreciated that any other appropriate known or later-developed identification format can be included.

The status column 1630 of any service 1611-1615 identifies the present state of the data to be delivered to the identified specific destination and/or recipient. Those recipients from whom a receipt or other form of confirmation has been received are marked as having a success status 1631. In various exemplary embodiments, if an error message is received indicating a delivery failure and/or if a successful receipt is not received before a defined time limit, a failure status 1633 is reported. If available, a specific error message is, in various exemplary embodiments, included when the status is "failed". If no information is available regarding the status of a specific recipient, a pending status 1632 is reported.

The send settings column 1640 identifies job settings that are set individually for each type of service or, in some cases, for each recipient. In particular, it should be appreciated that some settings are only applicable to specific services. For email and scan to file/repository services 1611 and 1612, the file type setting 1641 is included as a send setting status. For the scan to file/repository and IFAX services 1612 and 1614, the user setting 1642 or job requester labeled "from" is shown as a send setting status. For the FAX and print services 1613 and 1615, the resolution setting 1643 is a send setting. A facsimile protocol setting 1644, which indicates which protocol is used, such as the "super G3" protocol indicated in the example shown in FIG. 3, and a cover sheet status setting 1645, which indicates whether the cover sheet function is active, are send settings specific to the FAX service 1613. The priority setting 1646 is shown as a send setting status for the email, FAX and IFAX services 1611, 1613 and 1614. A Quantity setting 1647 and a Collate & Staple on/off setting 1648 are send settings specific to the print service 1615.

It should be appreciated that any one or more of the send settings may be omitted from the multi-destination status portion 1600. It should also be appreciated that send settings shown in FIG. 3 for the multi-destination status portion 1600 can be used for services other than or in addition to the services in which they are shown. It should also be appreciated that any other appropriate known or later-developed send settings can be included in the multi-destination status portion 1600.

Figure 4:
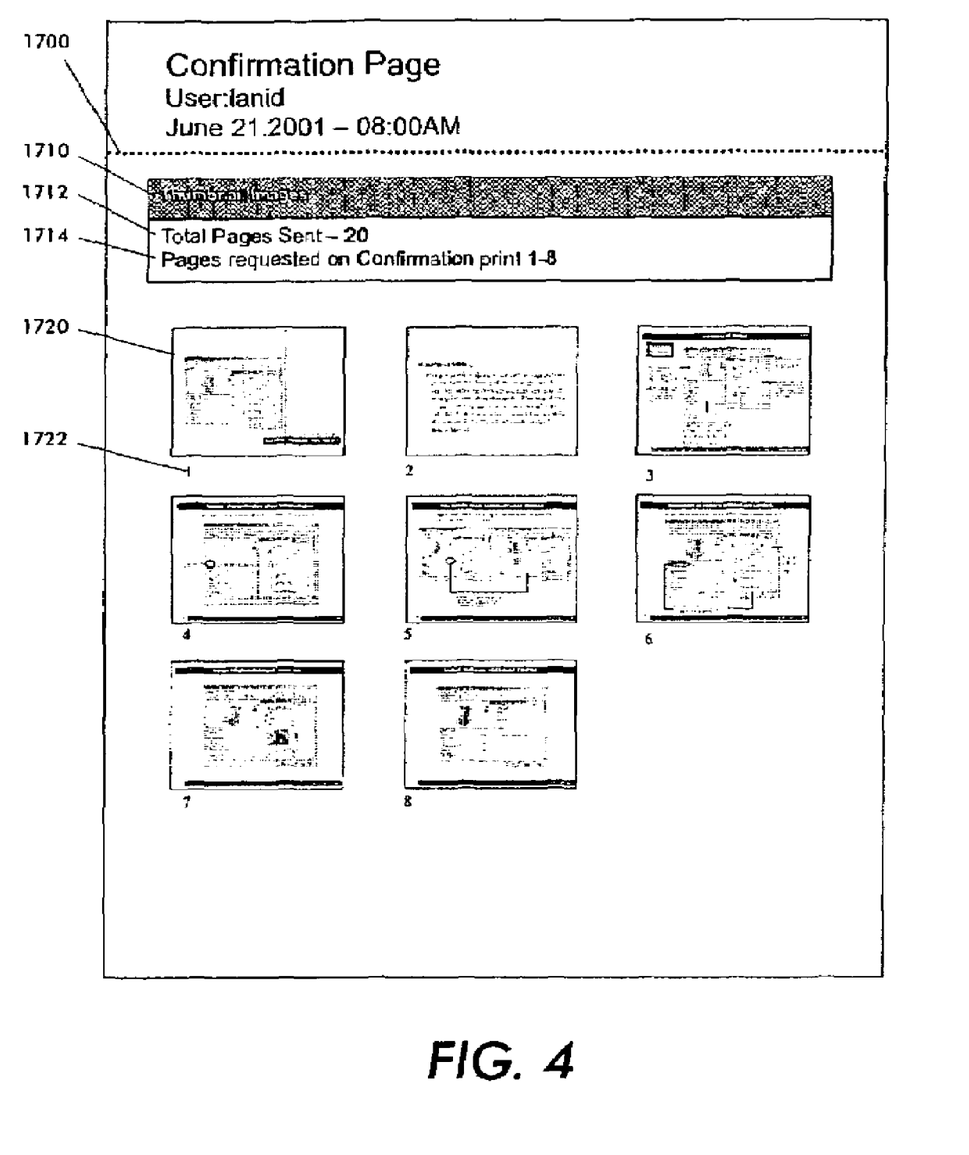
FIG. 4 illustrates in greater detail one exemplary embodiment of a thumbnail images portion of a confirmation sheet.

FIG. 4 illustrates in greater detail one exemplary embodiment of the thumbnail images portion 1700 of the confirmation sheet 1000. As shown in FIG. 4, a header 1710 for the thumbnail images portion 1700 includes a total number of pages selected to be sent 1712 and the specific pages 1714 selected for inclusion in the thumbnail images portion 1700. A thumbnail image 1720 of each selected page of the document distribution job is added to the confirmation page, along with an image identifier 1722, such as a page number, an alpha-numerical string, or the like, that identifies the corresponding image or page of the complete submitted document distribution job. It should be appreciated that any subset of the pages in the complete submitted document distribution job may be included in the confirmation sheet 1000. It should also be appreciated that the pages to be included in the confirmation sheet 1000 can be predetermined or can selectably determined when a document distribution job is submitted or a status is requested.

Figure 5:
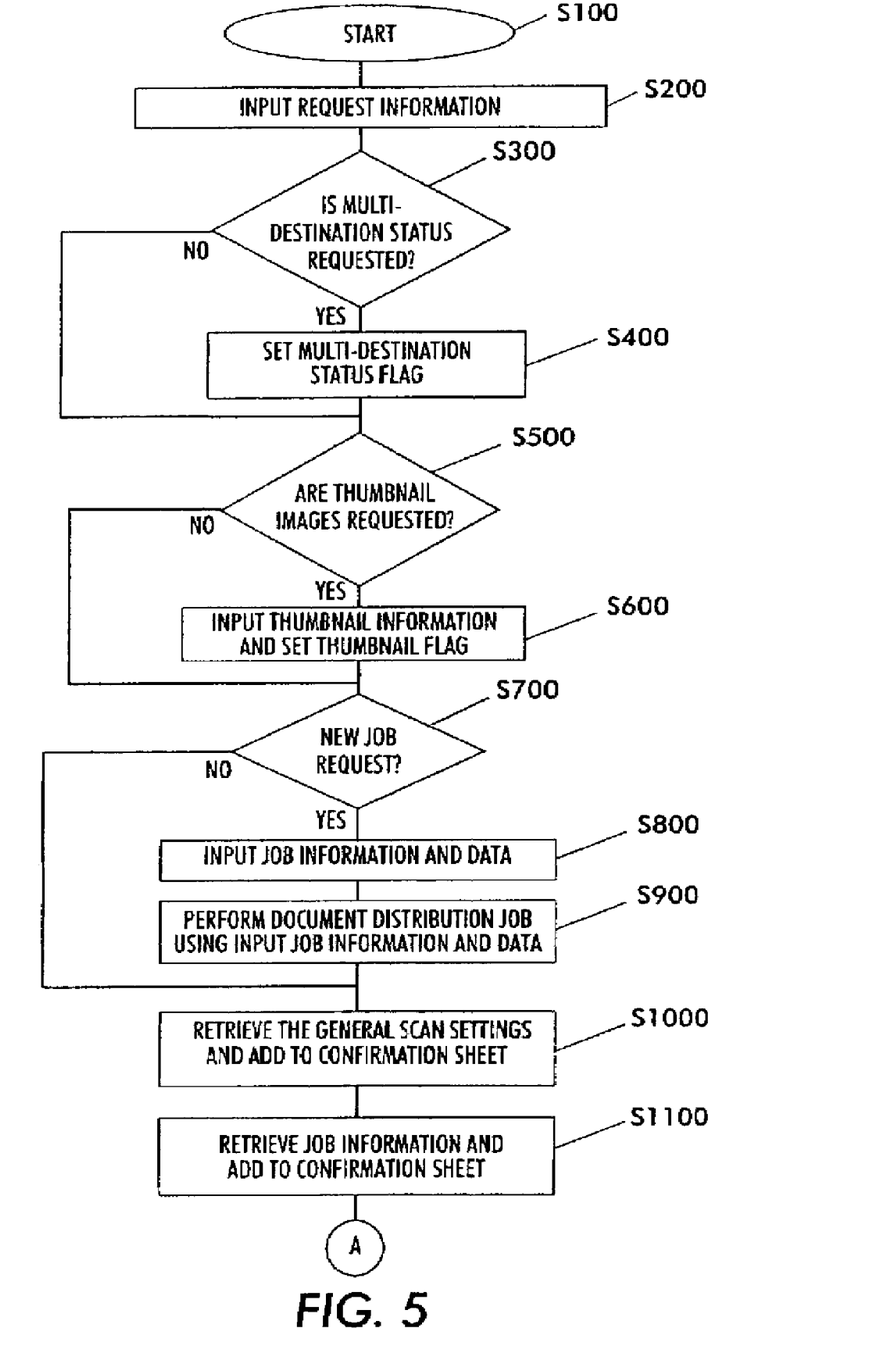
FIGS. 5 and 6 are a flowchart outlining one exemplary embodiment of a method for generating confirmation sheets containing multi-destination multi-service status and/or thumbnail images.
Figure 6:
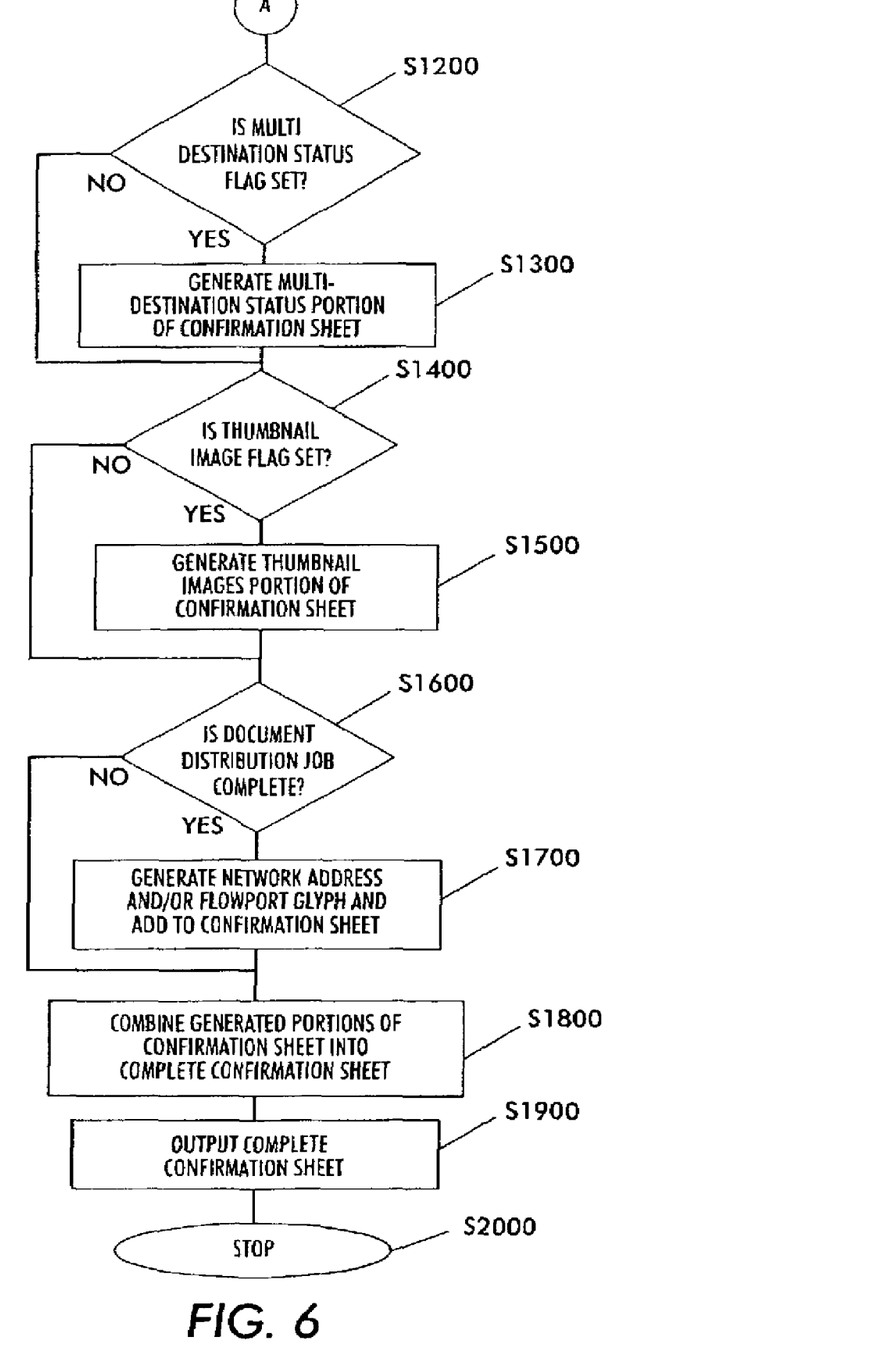

FIGS. 5 and 6 are a flowchart outlining one exemplary embodiment of a method for generating comprehensive confirmation sheets according to this invention. As shown in FIGS. 5 and 6, operation of the method begins in step S100, and continues to step S200, where a request for a distribution job confirmation sheet or an updated confirmation sheet is input. In various exemplary embodiments, the request is input as a portion of creating a distribution job. In various other exemplary embodiments, the request is input by accessing the network address provided on an earlier confirmation sheet to obtain an updated confirmation sheet. In various other exemplary embodiments, the request is input, and thus the updated confirmation sheet is accessed, by using the flowport glyph as outlined above.

In any case, the input confirmation sheet request input in step S200 identifies the job for which the confirmation sheet is desired, and the type of confirmation sheet, example, a multi-destination-status confirmation sheet, a thumbnail confirmation sheet, a combined confirmation sheet or even no confirmation sheet. Then, in step S300, a determination is made whether the confirmation sheet request indicates that the multi-destination status information is to be included in the confirmation sheet. If multi-destination status information was requested, operation continues to step S400. Otherwise, operation jumps directly to step S500.

In step S400, a flag is set, indicating multi-destination status information is requested. Then, in step S500, a determination is made whether the confirmation sheet request indicates that thumbnail images of the pages in the document distribution job are to be included in the confirmation sheet. If thumbnail images were requested, operation continues to step S600. Otherwise, operation jumps directly to step S700. In step S600, information is input on which pages for which thumbnails in the confirmation sheet is desired. Operation then continues to step S700.

In step S700, a determination is made whether the request is associated a new distribution job or if the request is for an updated confirmation sheet for a distribution job that was previously started. If the request is associated with a new distribution job, operation continues to step S800. Otherwise, operation jumps directly to step S1000. In step S800, the parameters and settings needed to perform the new distribution job are input. Then, in step S900, the one or more distribution services requested in the new distribution job are performed to transmit the data using one or more services and/or to one or more recipients. Operation then continues to step S1000.

In step S1000, the general scan settings for the document distribution job are retrieved and placed on the confirmation sheet. Next, in step S1100, the document distribution job information is retrieved and placed on the confirmation sheet. Then in step S1200, a determination is made whether the multi-destination status flag was set. If multi-destination status flag was set, operation continues to step S1300. Otherwise, operation jumps directly to step S1400.

In step S1300, the multi-destination status portion of the confirmation sheet is generated. Next, in step S1400, a determination is made whether thumbnail images request information was input. If thumbnail image request information was input, operation continues to step S1500. Otherwise, operation jumps directly to step S1600. In step S1500, the thumbnail images portion of the confirmation sheet is generated. Then, in step S1600, a determination is made whether any requested service is incomplete and/or whether the transmission to any recipient is not complete. If so, operation continues to step S1700. Otherwise, operation jumps to step S1800. In step S1700, the network address and/or the flowport glyph for updated status is generated. Operation then continues to step S1800.

In step S1800, the generated portions of the confirmation sheet are combined into a completed confirmation sheet. Next, in step S1900, the completed confirmation sheet is output. Operation then continues to step S2000, where operation of the method ends.

It should be appreciated that the method outlined in FIGS. 5 and 6 permits the user to change the information to be included in the confirmation sheet when requesting an updated confirmation sheet. That is, the information that was originally requested to be included in the confirmation sheet when the job distribution request was input can be changed when requesting the updated confirmation sheet. In various other exemplary embodiments, the method outlined in FIGS. 5 and 6 can be modified to place step S700 before step S200. In this case, if an updated confirmation sheet is requested, steps S200-S600 are skipped in addition to steps S800 and S900. Thus, in this case, the information included in the confirmation sheet cannot be changed when an updated confirmation sheet is requested.

Figure 7:
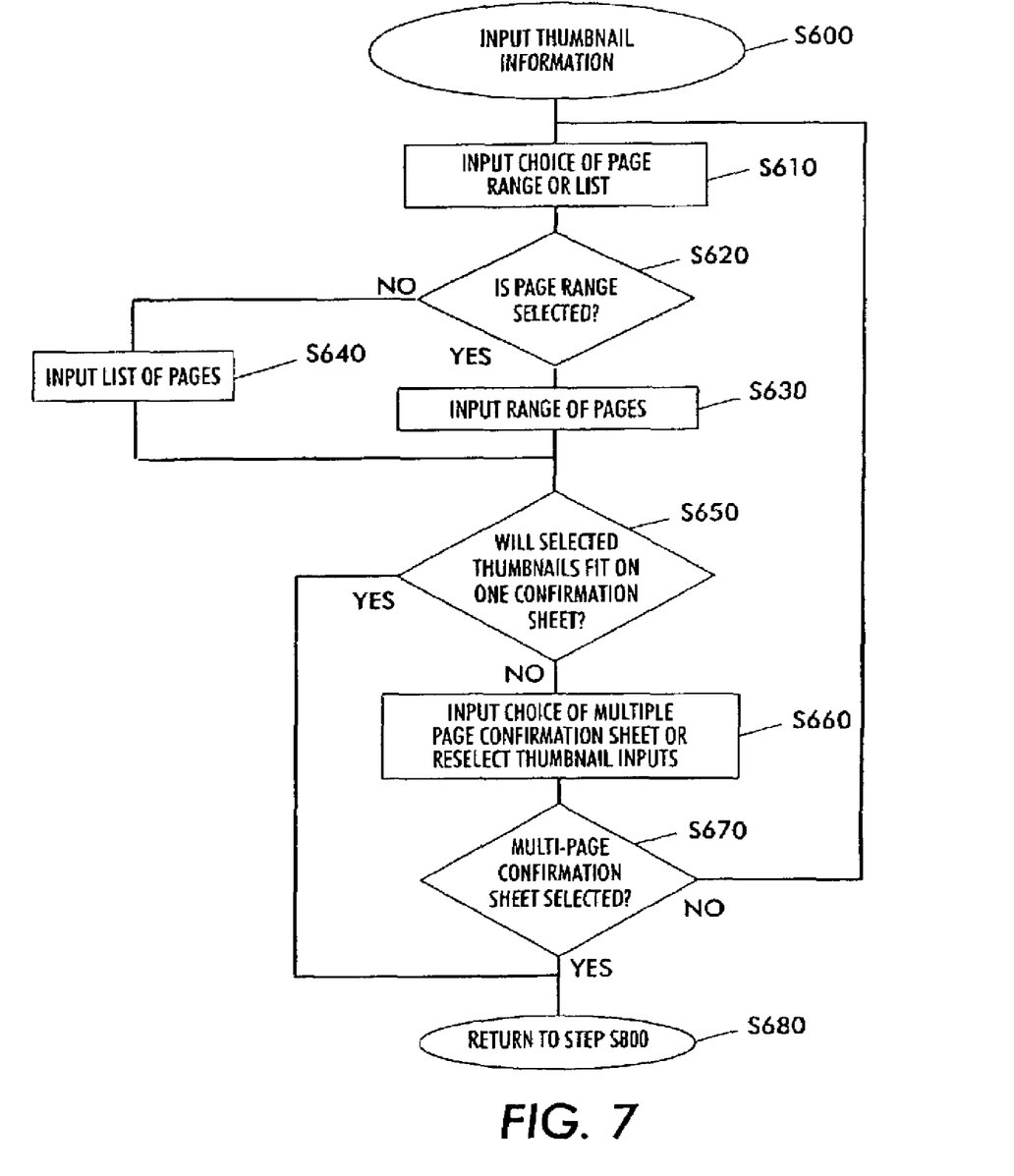
FIG. 7 is a flowchart outlining in greater detail one exemplary embodiment of a method for inputting thumbnail image request information.

FIG. 7 is a flowchart outlining in greater detail one exemplary embodiment of the method for inputting thumbnail request information. As shown in FIG. 7, operation of the method begins in step S600, and continues to step S610, where the requester inputs a choice whether a page range or list of pages is to be used. Then, in step S620, a determination is made whether requester input a page range. If a page range was input, operation continues to step S630. Otherwise, operation jumps to step S640.

In step S630, the requester inputs the range of pages wanted in the thumbnail image portion of the confirmation sheet. Operation then continues to step S650. In contrast, in step S640, the requester inputs the list of pages wanted in the thumbnail image portion of the confirmation sheet. Then, in step S650, a determination is made whether the selected thumbnail images will fit on a one-page confirmation sheet. If the thumbnail images will fit on a single page confirmation sheet, operation jumps to step S680. Otherwise, operation continues to step S660.

In step S660, the requester is requested to input a choice of a multiple page confirmation sheet or indicate that the user wants to reselect the thumbnail pages requested and the users selections are input. Then in step S670, a determination is made whether a multiple page confirmation sheet was selected. If a multiple page confirmation sheet was not selected, operation returns to step S610. Otherwise, operation continues to step S680, where operation returns to step S700.

Figure 8:
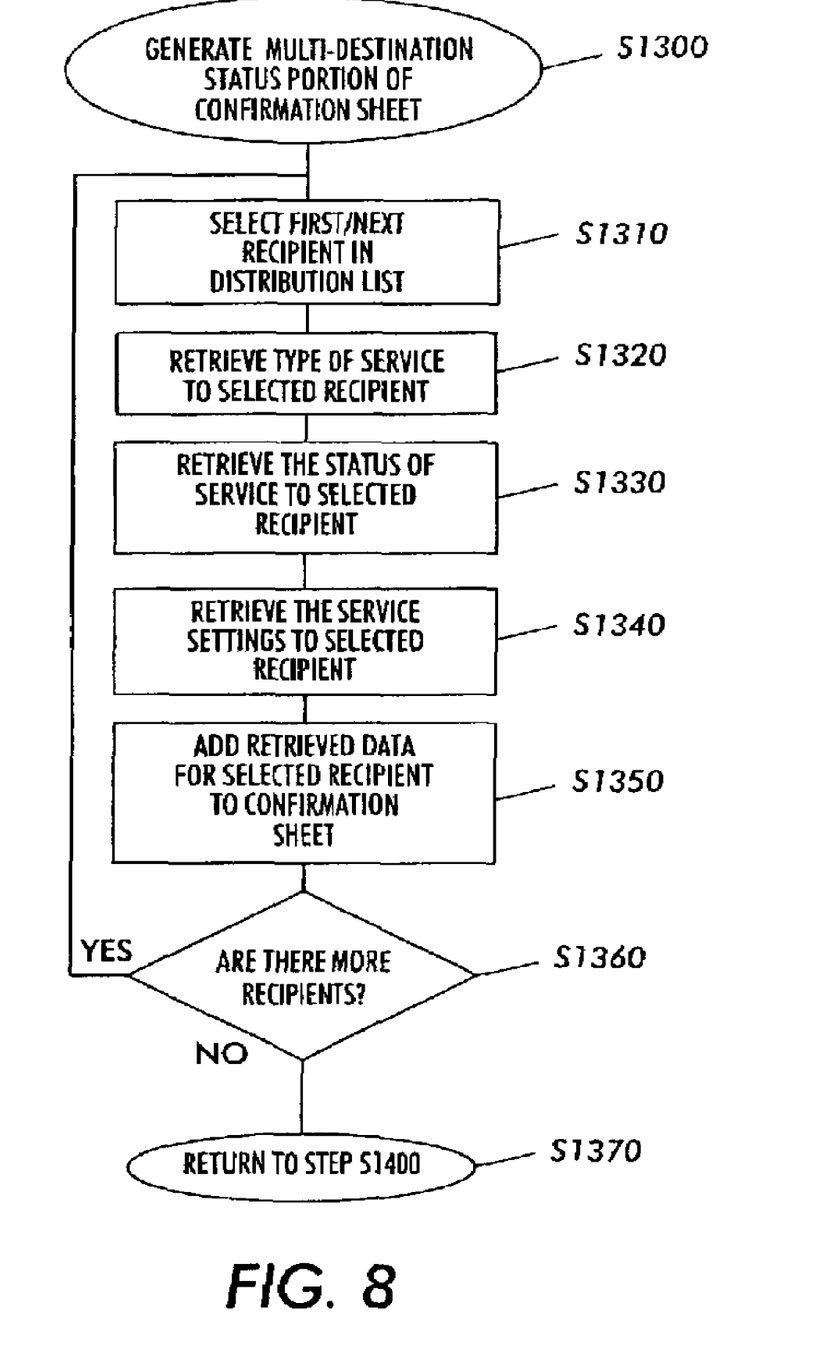
FIG. 8 is a flowchart outlining in greater detail one exemplary embodiment of a method for generating a multi-destination and/or multi-service status portion of a confirmation sheet.

FIG. 8 is a flowchart outlining in greater detail one exemplary embodiment of the method for generating the multi-destination status portion of the confirmation sheet. As shown in FIG. 8, operation of the method begins in step S1300, and continues to step S1310, where the first or next recipient in the distribution list of the document distribution job is selected. Next, in step S1320, the type of service for the selected recipient is retrieved. Then, in step S1330, the status of the selected recipient is retrieved. Next, in step S1340, the service specific and recipient specific settings are retrieved. Operation then continues to step S1350.

In step S1350, the data retrieved for the selected recipient is added to the confirmation sheet. Next, in step S1360, a determination is made whether there are any more recipients on the distribution list. If there are more recipients, operation returns to step S1310. Otherwise, operation continues to step S1370, where operation returns to step S1400.

Figure 9:
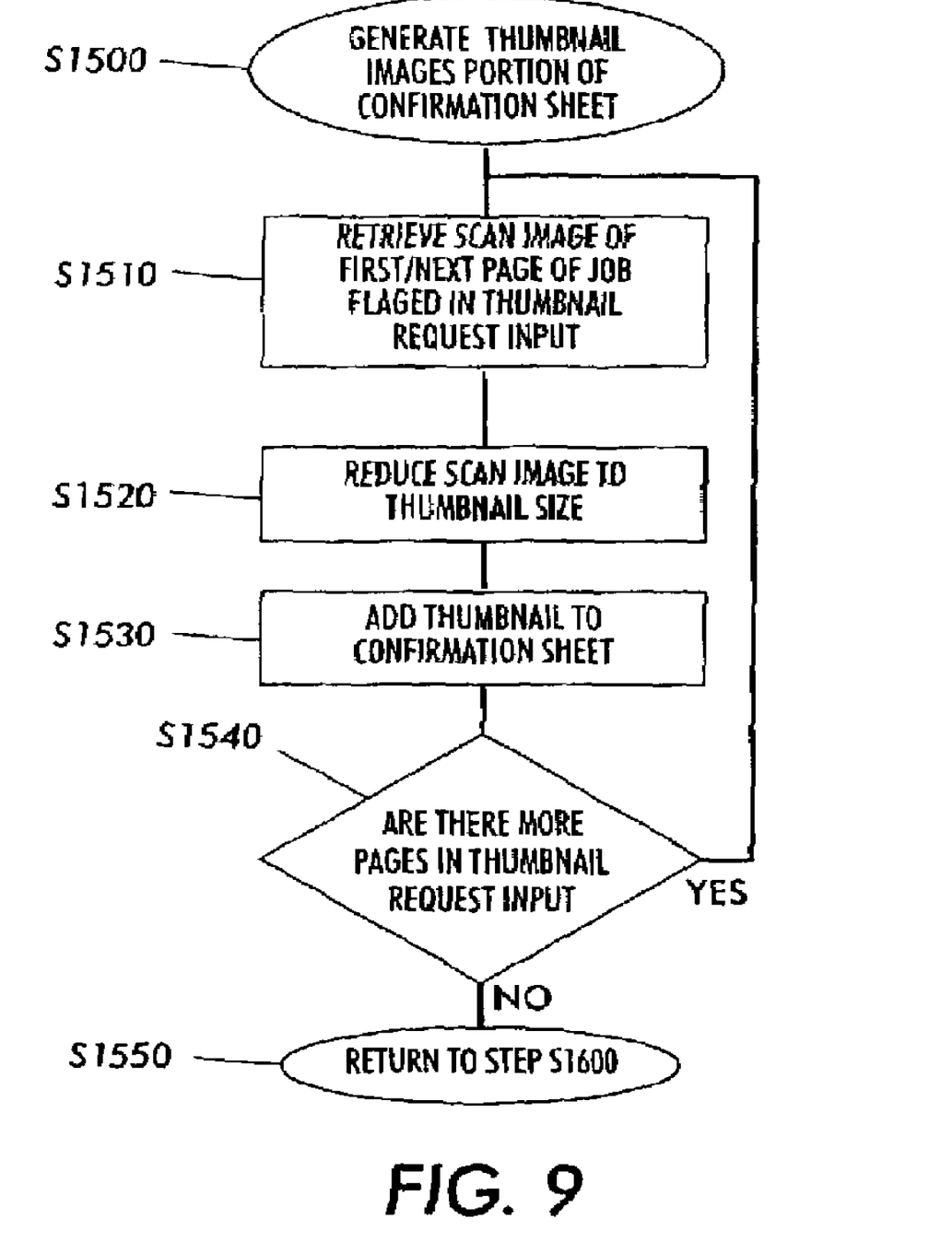
FIG. 9 is a flowchart outlining in greater detail one exemplary embodiment of a method for generating a thumbnail images portion of a confirmation sheet.

FIG. 9 is a flowchart outlining in greater detail one exemplary embodiment of the method for generating the thumbnail images portion of the confirmation sheet. As shown in FIG. 9, operation of the method begins in step S1500, and continues to step S1510, where the first or next page in the in the range of pages or list of pages input in the request is retrieved. Next, in step S1520, the retrieved scan image is reduced to thumbnail size. Operation then continues to step S1530.

In step S1530, the thumbnail image is added to the confirmation sheet. Next, in step S1540, a determination is made whether there are more pages in the range of pages or list of pages input in the request. If there are more pages operation returns to step S1510. Otherwise, operation continues to step S1550, where operation returns to step S1600.

Figure 10:
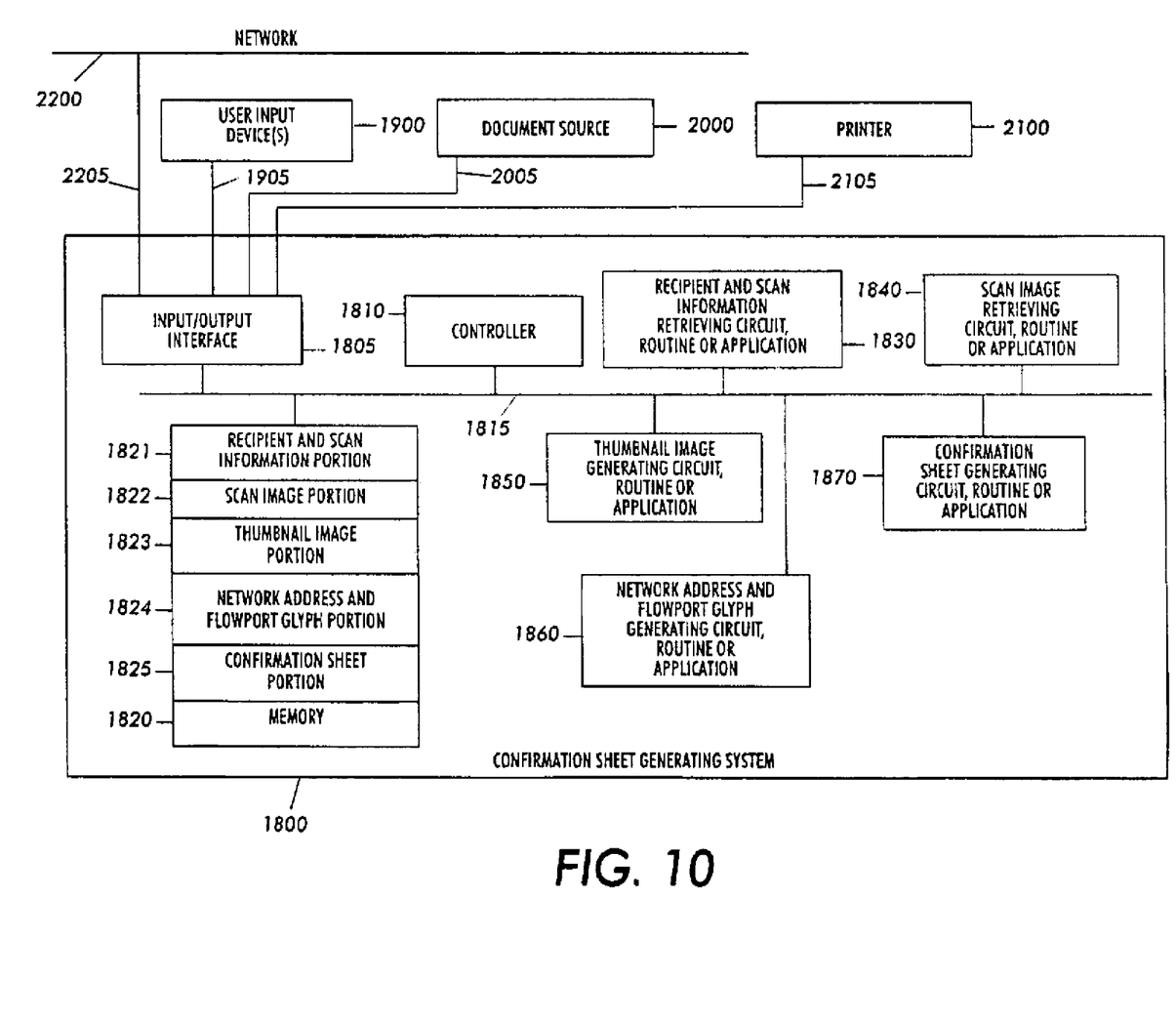
FIG. 10 is a block diagram of one exemplary embodiment of a confirmation sheet-generating device according to this invention.

FIG. 10 shows one exemplary embodiment of a confirmation sheet generating system 1800 according to this invention. As shown in FIG. 10, the confirmation sheet generating system 1800 includes an input/output interface 1805, a controller 1810, a memory 1820, a recipient and scan information retrieving circuit, routine or application 1830, a scan image retrieving circuit, routine or application 1840, a thumbnail image generating circuit, routine or application 1850, a network address and/or flowport glyph generating circuit, routine or application 1860, a confirmation sheet generating circuit, routine or application 1870, each interconnected by one or more control and/or data busses and/or application programming interfaces 1815.

As shown in FIG. 10, one or more user input devices 1900, a document source 2000, a printer 2100 and one or more networks 2200 are connected to the confirmation sheet generating system 1800 by links 1905, 2005, 2105 and 2205, respectively.

In general, the document source 2000 shown in FIG. 10 can be any known or later-developed device that is capable of providing digital scan images of documents and/or electronic files of documents to the confirmation sheet generating system 1800 of this invention. In general, the printer 2100 shown in FIG. 10 can be any known or later-developed device that is capable of printing the confirmation sheet generated by the confirmation sheet generating system 1800 of this invention.

The document source 2000 or the printer 2100 can be integrated with the confirmation sheet generating system 1800, such as in a general-purpose computer with internal magnetic storage disk. In addition, the confirmation sheet generating system 1800 may be integrated with devices providing additional functions in addition to the document source 2000 or the printer 2100, such as in a larger system that performs all functions, such as a multi-function printer/scanner/copier.

The respective one or more user input devices 1900 may be any combination of one or more input devices, such as a keyboard, a mouse, a joy stick, a trackball, a touch pad, a touch screen, a pen-based system, a microphone and associated voice recognition software, or any other known or later-developed device for inputting user commands to the confirmation sheet generating system 1800. It should be understood that the one or more user input devices 1900, of FIG. 10 do not need to be the same type of device.

Each of the links 1905, 2005, 2105 and 2205 connecting the input device(s) 1900, the document source 2000, the printer 2100 and the network(s) 2200 to the confirmation sheet generating system 1800 can be a connection device, such as a direct cable connection, a modem, a local area network, a wide area network, a storage area network, an intranet, the Internet, any other distributed processing network, or any other known or later-developed connection device. It should be appreciated that any of these connections may be include wired and/or wireless portions. In general, each of the links 1905, 2005, 2105 and 2205 can be of any known or later-developed connection system or structure usable to connect the respective devices to the confirmation sheet generating system 1800. It should be understood that the links 1905, 2005, 2105 and 2205 do not need to be of the same type.

As shown in FIG. 10, the memory 1820 can be implemented using any appropriate combination of alterable, volatile, or non-volatile memory or non-alterable, or fixed memory. The alterable memory, whether volatile or non-volatile can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk and disk drive, or the like.

Each of the various elements of the confirmation sheet generating system 1800 can be implemented as software executing on a programmed general purpose computer, a special purpose computer, a microprocessor or the like. Alternatively, each of the various elements of the confirmation sheet generating system 1800 can implemented as a routine embedded in a library, or a resource residing on a server, or the like. It should be understood that each of the various elements of the confirmation sheet generating system 1800 do not need to be implemented the same way. Various exemplary embodiments of the confirmation sheet generating system 1800 can be implemented by physically incorporating that device into a software and/or hardware system, such as a speech recognition system or language translation system of a computer or communication device.

Thus, it should also be understood that each of the circuits, routines, applications or managers shown in FIG. 10 can be implemented as portions of a suitably programmed general-purpose computer. Alternatively, each of the circuits, routines, applications or managers shown in FIG. 10 can be implemented as physically distinct hardware circuits within an ASIC, using a digital signal processor (DSP), using a FPGA, a PLD, a PLA and/or a PAL, or using discrete logic elements or discrete circuit elements. The particular form of the circuits, routines, applications or managers shown in FIG. 10 will take is a design choice and will be obvious and predictable to those skilled in the art. It should be appreciated that the circuits, routines or managers shown in FIG. 10 do not need to be of the same design.

When operating the confirmation sheet generating system 1800, the request for conformation sheet and any additional needed information is input from one of the user input devices 1900 over the link 1905 as shown in FIG. 10. The input/output interface 1805 inputs the confirmation sheet request, and under the control of the controller 1810, forwards it to the recipient and scan information retrieving circuit, routine or application 1830.

The recipient and scan information retrieving circuit, routine or application 1830 then retrieves the recipient specific and general scan information from the document source over the link 2005, under control of the controller 1810. The recipient specific and general scan information is organized and then, under the control of the controller 1810, is stored in the recipient and scan information portion 1821 of the memory 1820, or is handed off directly to the confirmation sheet generation circuit, routine or application 1870.

The scan image retrieving circuit, routine or application 1840 then retrieves the scan images from the document source 2000 over the link 2005, under control of the controller 1810. Then, under the control of the controller 1810, the scan images are stored in the scan image portion 1822 of the memory 1820, or are handed off directly to the thumbnail image generating circuit, routine or application 1850.

The thumbnail image generating circuit, routine or application 1850, then retrieves the scan images from the scan image portion 1822 of the memory 1820, or receives the scan images directly, under control of the controller 1810, and resizes the received images to thumbnail images. Then, under the control of the controller 1810, the thumbnail images are stored in the thumbnail image portion 1823 of the memory 1820, or are handed off directly to the confirmation sheet generating circuit, routine or application 1870.

The network address and flowport glyph generating circuit, routine or application 1860 then generates a network address and/or a flowport glyph if any service is incomplete and/or any transmission to a recipient or destination is incomplete. Then, under the control of the controller 1810, the network address and/or the flowport glyph are stored in the network address and flowport glyph portion of the memory 1824, or are handed off directly to the confirmation sheet generating circuit, routine or application 1870.

The confirmation sheet generating circuit, routine or application 1870 then retrieves the recipient specific and general scan information from the recipient and scan information portion 1821, the thumbnail images from the thumbnail image portion 1823, and the network address and/or the flowport glyph, if created, from the network address and flowport glyph portion 1824 of the memory 1820, or receives the information directly, under control of the controller 1810, and generates a confirmation sheet, such as that shown in FIG. 1. Then, under the control of the controller 1810, the confirmation sheet, is then stored in the confirmation sheet portion 1825 of the memory 1820 or is output directly to the printer 2100, over the link 2105 and/or is emailed to the requester vial the network 2200 over the link 2205, under the control of the controller 1810.

The confirmation sheet generating system 1800 shown in FIG. 10 is, in various exemplary embodiments, implemented on a programmed general-purpose computer. However, the confirmation sheet generating system 1800 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 5-9, can be used to implement the confirmation sheet generating system 1800.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A processor-implemented method for generating a confirmation sheet in response to transmitting a plurality of pages of a document, comprising:
    generating a plurality of thumbnail images, each thumbnail image generated from one of the plurality of pages of the document;
    incorporating the generated plurality of thumbnail images into the confirmation sheet;
    generating a first identifier associated with each of the plurality of thumbnail images on the confirmation sheet such that the confirmation sheet includes a plurality of first identifiers, each of the first identifiers identifies a specific page from among the plurality of pages of the document from which the associated thumbnail image was generated; and
    generating an information portion separate from the first identifiers, the information portion including an alphanumeric list of the pages associated with the thumbnails that are selected for inclusion in the confirmation sheet, the list disposed in only one location on the confirmation sheet within the information portion; and
    outputting the confirmation sheet with the plurality of generated thumbnail images, the list and first identifiers, wherein
    the information portion and the list do not include the plurality of thumbnail images; and
    when less than all of the plurality of pages of the document are selected for generation of thumbnail images, the list identifies only the specific pages for which thumbnail images are generated.

2. The method of claim 1, further comprising:
    outputting the confirmation sheet with the first identifiers located relative to the associated thumbnail image.

3. The method of claim 1, wherein the information portion also identifies the total number of pages that were transmitted.

4. The method of claim 1, wherein:
    inputting information from a user indicating which pages thumbnail images are to be generated for comprises inputting a range of pages; and
    generating the list comprises generating an indication of the range of pages.

5. The method of claim 1, wherein:
    inputting information from a user indicating which pages thumbnail images are to be generated for comprises inputting a selection of individual ones of the pages; and
    generating the list comprises generating an indication of the individual ones of the pages.

6. The method of claim 1, wherein transmitting the plurality of pages comprises transmitting the plurality of pages using at least one service, the at least one service comprising at least one of at least facsimile, internet facsimile, scan to file, scan to repository, scan to print, email, and printing.

7. A confirmation sheet generating system usable to generate a confirmation sheet in response to transmitting a plurality of pages of a document, comprising:
    a controller;
    a memory;
    a thumbnail generating circuit, routine or application that generates a plurality of thumbnail images, each thumbnail image generated from one of the plurality of pages of the document; and a confirmation sheet generating circuit, routine or application that generates the confirmation sheet incorporating the plurality of generated thumbnail images, wherein the thumbnail generating circuit, routine or application further generates, for the plurality of the thumbnail images;

a first identifier associated with each of the plurality of thumbnail images on the confirmation sheet such that the confirmation sheet includes a plurality of first identifiers, each of the first identifiers identifies a specific page from among the plurality of pages of the document from which the associated thumbnail image was generated; and an information portion separate from the first identifiers, the information portion including an alphanumeric list of the pages associated with the thumbnails that are selected for inclusion in the confirmation sheet, the list disposed in only one location on the confirmation sheet within the information portion, wherein the information portion and the list do not include the plurality of thumbnail images; and when less than all of the plurality of pages of the document are transmitted or when the plurality of pages are selected for generation of the thumbnail images, the list identifies only the specific pages for which thumbnail images are generated.

8. The confirmation sheet generating system of claim 7, wherein the information portion also identifies the total number of pages that were transmitted.

9. The confirmation sheet generating system of claim 7, wherein the list indicates a range of pages.

10. The confirmation sheet generating system of claim 7, wherein the list indicates individual ones of the pages.

11. The confirmation sheet generating system of claim 7, wherein the plurality of pages were transmitted by at least one service, the at least one service comprising at least one of at least facsimile, internet facsimile, scan to file, scan to repository, scan to print, email, and print.

12. A recording medium storing a control program usable to generating a confirmation sheet in response to transmitting a plurality of pages of a document, the control program comprising:

instructions for generating a plurality of thumbnail images, each thumbnail image generated from one of the plurality of pages of the document;

instructions for incorporating the plurality of generated thumbnail images into the confirmation sheet;

instructions for generating a first identifier associated with each of the plurality of thumbnail images on the confirmation sheet such that the confirmation sheet includes a plurality of first identifiers, each of the first identifiers identifies a specific page from among the plurality of pages of the document from which the associated thumbnail image was generated;

instructions for generating an information portion separate from the first identifiers, the information portion including an alphanumeric list of the pages associated with the thumbnails that are selected for inclusion in the confirmation sheet, the list disposed in only one location on the confirmation sheet within the information portion; and instructions for outputting the confirmation sheet with the plurality of generated thumbnail images, the list and first identifiers, wherein the information portion and the list do not include the plurality of thumbnail images; and when less than all of the plurality of pages of the document are selected for generation of thumbnail images, the list identifies only the specific pages for which thumbnail images are generated.

13. The recording medium of claim 12, the control program further comprising:

outputting the confirmation sheet with the first identifiers located relative to the associated thumbnail image.

14. The recording medium of claim 12, wherein the information portion also identifies the total number of pages that were transmitted.

15. The recording medium of claim 12, wherein:

the instructions for inputting information from a user indicating which pages thumbnail images are to be generated for comprise instructions for inputting a range of pages; and the instructions for generating the list comprise instructions for generating an indication of the range of pages.

16. The recording medium of claim 12, wherein:

the instructions for inputting information from a user indicating which pages thumbnail images are to be generated for comprise instructions for selecting individual ones of the pages; and the instructions for generating the list comprise instructions for generating an indication of the selected individual ones of the pages.

17. The recording medium of claim 12, wherein transmitting the plurality of pages comprises transmitting the plurality of pages using at least one service, the at least one service comprising at least one of at least facsimile, internet facsimile, scan to file, scan to repository, scan to print, email, and printing.

* * * * *